UNITED STATES PATENT OFFICE.

JOHN HERMAN, OF LINCOLN, NEBRASKA.

PROCESS OF REDUCING ORES.

No. 909,795.  Specification of Letters Patent.  Patented Jan. 12, 1909.

Original application filed September 15, 1905, Serial No. 278,652. Patent No. 831,160, dated September 18, 1906. Divided and this application filed March 14, 1906. Serial No. 305,983.

*To all whom it may concern:*

Be it known that I, JOHN HERMAN, citizen of the United States, residing at Lincoln, in the county of Lancaster and State of Nebraska, have invented new and useful Improvements in Processes for Reducing Ores, of which the following is a specification.

My invention has reference to a process of reducing ores to a metallic condition, and will be fully understood from the following description and claim.

In practicing my process I burn carbonaceous fuel in a suitable compartment and in such manner as to form carbon monoxid as well as carbon dioxid, and put the resultant hot gases in contact with oxidized ores. I prefer to crush the ores to be treated to a suitable size, say three-fourths of an inch, and to put the before mentioned hot gases in contact therewith by passing the gases through or over the ores in a compartment other than that in which the carbonaceous fuel is burned. In virtue of the step described, it will be observed that the oxids are reduced to metallic globules if the temperature is higher than the melting point of the metal reduced or to a powdery mass if the temperature is low—

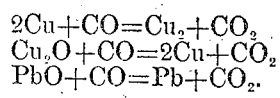

$$2Cu + CO = Cu_2 + CO_2$$
$$Cu_2O + CO = 2Cu + CO_2$$
$$PbO + CO = Pb + CO_2.$$

In the event of the ore to be treated bearing copper and being comparatively free from acid destroying components, I prefer to produce the metal at a low temperature and extract the copper through the agency of a solution of cupric chlorid and salt, and electrolyze the cuprous chlorid, resulting from such operation, with a deposition of copper and the regeneration of cupric chlorid in accordance with well known reactions—

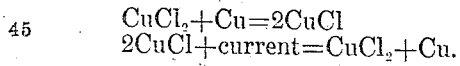

$$CuCl_2 + Cu = 2CuCl$$
$$2CuCl + current = CuCl_2 + Cu.$$

If preferable the same results may be attained by substituting ferric chlorid for cupric chlorid as follows—

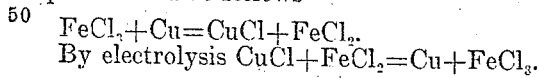

$$FeCl_3 + Cu = CuCl + FeCl_2.$$

By electrolysis $CuCl + FeCl_2 = Cu + FeCl_3$.

With a view of utilizing the full heat value of the fuel, I inject air into the ore compartment at a point where it will not interfere with the subsequent reduction of the ore. I prefer to inject this air into a body of descending ore at a point above that at which the ore is reduced, and to depend on such air to burn or promote the combustion of the surplus carbon monoxid and liberate heat, whereby the ore is heated before entering the reducing part of the apparatus or furnace employed. Another advantage follows from injecting the air as stated, viz: any sulfids that are present are oxidized and rendered fit for reduction.

Subsequent to the operations described, the ore is either leached with cupric chlorid or ferric chlorid and electrolyzed or is concentrated according to existing conditions.

By merely changing the proportions between carbon monoxid and carbon dioxid the reduction of metals can be well controlled. For instance by having the ratio of carbon monoxid to carbon dioxid less than 2:1 iron oxids will not be reduced to metallic condition. The ratio of the gas may be and preferably is controlled by the depth of the fuel bed.

My process is materially advantageous since it provides a means for obtaining copper or other metals without the use of fluxes or acids, and the absence of molten slag renders it feasible to dispense with water jackets for the furnace. It will also be noted that my process is economical because of the utilization of the inexpensive hot blast to reduce fuel consumption.

I am aware that attempts have been made to reduce oxidized ores by mixing ore and fuel direct. When this is done, however, the portions of ore nearest the points of entry of the blast are necessarily exposed to oxidation, thereby defeating the object of treatment.

I am also aware of methods for reducing iron ores, but in these no attempts have been made to isolate different metals nor to render the ores suitable for the treatment proposed, the iron in such cases being left as a metallic sponge.

I claim:

The process described which consists in burning carbonaceous fuel in a suitable compartment to form a reducing atmosphere, and passing the hot resultant gases in proximity to copper ores to reduce the copper ores to a metallic condition, then treating the ores with a chlorid solution adapted to extract the copper, and then electrolyzing the resultant solution of the chlorid to produce metallic copper at the cathode and regenerating chlorid at the anode suitable for treating fresh charges of ore which has been reduced.

In testimony whereof I have hereunto set my hand in presence of two subscribing witnesses.

JOHN HERMAN.

Witnesses:
   Geo. R. Hill,
   J. Weinberger.